H. BOHNE.
RESILIENT WHEEL.
APPLICATION FILED DEC. 4, 1918.
1,318,259.
Patented Oct. 7, 1919.
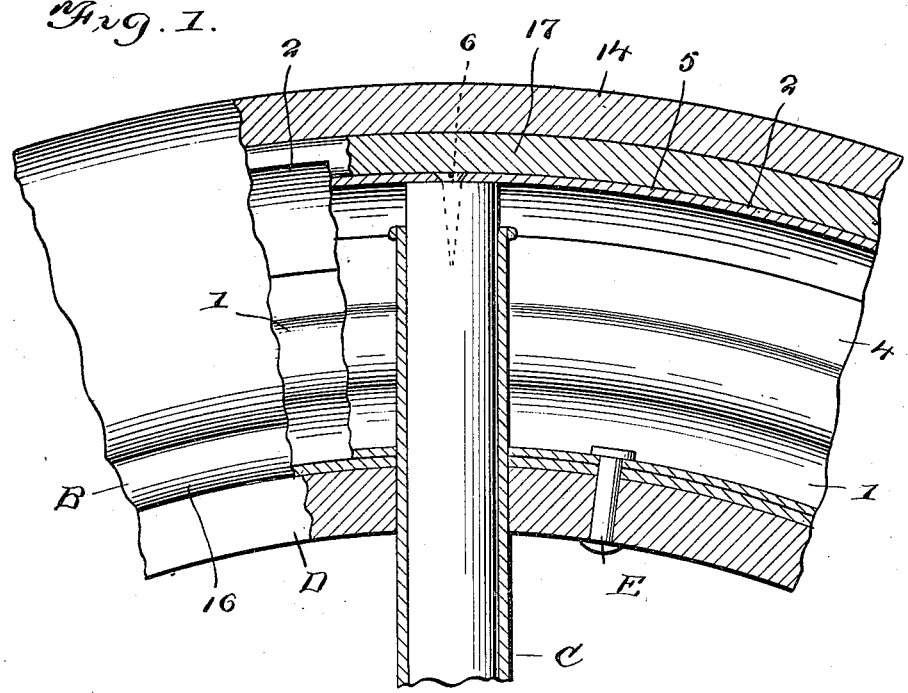
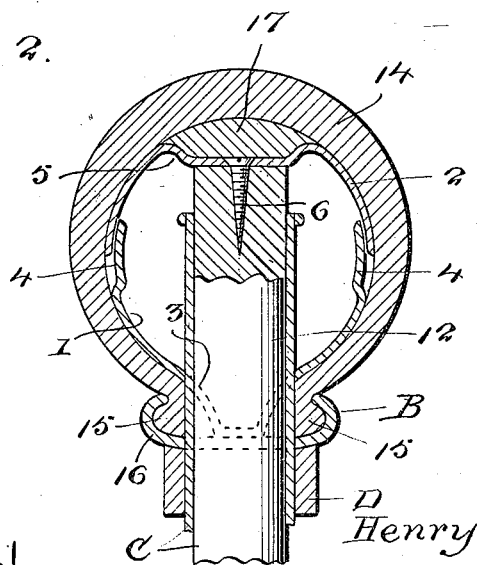
Inventor
Henry Bohne
By Victor J. Evans
Attorney

UNITED STATES PATENT OFFICE.

HENRY BOHNE, OF DODGE, NEBRASKA.

RESILIENT WHEEL.

1,318,259.  Specification of Letters Patent.  Patented Oct. 7, 1919.

Application filed December 4, 1918. Serial No. 265,276.

*To all whom it may concern:*

Be it known that I, HENRY BOHNE, a subject of the Emperor of Germany, residing at Dodge, in the county of Dodge and State of Nebraska, have invented new and useful Improvements in Resilient Wheels, of which the following is a specification.

My present invention pertains to resilient wheels and more particularly to the tire constructions thereof and the elements that coöperate with the tires.

The invention contemplates the provision in a resilient wheel of an improved tire construction that is, at once, highly resilient and strong, and is, therefore, notwithstanding its resilient capacity, well adapted to withstand the shocks and strains to which such constructions and the wheels in which the same are embodied are ordinarily subjected.

With the foregoing in mind, the invention in all of its details will be fully understood from the following description and claim, when the same are read in connection with the drawings, accompanying and forming part of this specification, in which:

Figure 1 is a longitudinal vertical section, partly in side elevation of so much of a resilient wheel as is necessary to show the preferred embodiment of my present invention.

Fig. 2 is a transverse section of the same.

Similar letters and numerals of reference designate corresponding parts in both views of the drawings.

My present invention is preferably, though not necessarily, designed for embodiment in a resilient wheel having the hub construction shown and described in my Letters Patent No. 1,279,234, dated September 17, 1918.

Among other elements, my improvement comprises tubular spokes C, and a rim B; the spokes extending through the rim and being adapted to be fixed at their inner ends to the hub, preferably in the manner disclosed in my cited patent. Movable endwise through the tubular spokes C are inner spokes or plungers 12, said spokes being adapted to be cushioned at their inner ends in the manner and for the purpose set forth in my said patent. The present invention also comprises a shoe 14 of flexible material, such as rubber, leather, canvas, or a fabric containing rubber, canvas or the like; the said shoe being provided along its marginal edges with hook-like flanges 15, which engage corresponding flanges 16 at the opposite sides of the rim B as shown in Fig. 2. At 17 is a flexible distending hoop for the outer portion of the shoe 14; said hoop being of solid rubber or equivalent material, and preferably shaped as shown in cross-section. The inner spokes 12 are extended radially and adapted to play endwise through the rim B; the outer ends of the tubular spokes C being normally arranged about the distance illustrated from the outer ends of the spokes 12. Inclosed in the shoe 14 are preferably-resilient cushioning and distending members 1 and 2, which have for their function to maintain the tire in shape and to conduce to the cushioning and shock-absorbing capacity thereof. Each of the said members is formed of sheet steel or other sheet metal, and each extends entirely around the wheel. The member 1 is circumferentially channeled as indicated by 3 and is connected at suitable intervals to the rim B and the felly D through the medium of bolts E. Said member 1 is also provided with inwardly set marginal portions 4 to provide play spaces between the said portions and the inner side of the shoe 14, for the reception of the edge portions of the member 2. Said member 2 is provided with a peripheral and circumferential depression 5, and in said depression the hoop 17 is disposed; said hoop being arranged at the outer ends of screws 6 through the medium of which the member 2 is connected to the outer ends of the inner spokes 12.

From the foregoing description, considered with the drawings, it will be apparent that my novel tire construction is simple and inexpensive, and that by reason of the relative arrangement of the distending and cushioning members 1 and 2, the said members are adapted to permit of compression of the shoe 14 and to promptly and efficiently distend the said shoe subsequently to a compression thereof. It will also be appreciated that the said members 1 and 2, while contributing materially to the strength and durability of the tire construction, are not calculated to interfere in any measure with the endwise movement of the inner spokes 12 and the cushioning of the wheel in the hub thereof.

Having described my invention, what I claim and desire to secure by Letters Patent, is:

In a tire construction for resilient wheels, the combination of a rim, a shoe held to the rim, tubular spokes extending inwardly from the rim, inner spokes movable endwise in the tubular spokes and the rim, a resilient hoop arranged against the inner side of the shoe, a distending and cushioning means inclosed in the shoe and made up of an inner sheet metal member, connected to the rim and having inwardly set edge portions, and a sheet metal member that surrounds and is connected to the inner spokes and is provided with a peripheral channel receiving the hoop, said member having its edge portions disposed and movable in the spaces afforded between the shoe and the inwardly set portions of the first-named member.

HENRY BOHNE.

Copies of this patent may be obtained for five cents each, by addressing the "Commissioner of Patents, Washington, D. C."